United States Patent
Makeev et al.

(10) Patent No.: US 11,303,916 B2
(45) Date of Patent: Apr. 12, 2022

(54) MOTION COMPENSATION TECHNIQUES FOR VIDEO

(71) Applicant: V-NOVA INTERNATIONAL LIMITED, London (GB)

(72) Inventors: Ivan Makeev, London (GB); Balázs Keszthelyi, London (GB); Stergios Poularakis, London (GB); Michele Sanna, London (GB); Robert Ettinger, London (GB)

(73) Assignee: V-NOVA INTERNATIONAL LIMITED, London (GB)

( * ) Notice: Subject to any disclaimer, the term of this patent is extended or adjusted under 35 U.S.C. 154(b) by 0 days.

(21) Appl. No.: 16/467,912

(22) PCT Filed: Dec. 12, 2017

(86) PCT No.: PCT/GB2017/053716
§ 371 (c)(1),
(2) Date: Jun. 7, 2019

(87) PCT Pub. No.: WO2018/109455
PCT Pub. Date: Jun. 21, 2018

(65) Prior Publication Data
US 2020/0036994 A1 Jan. 30, 2020

(30) Foreign Application Priority Data

Dec. 12, 2016 (GB) .................................... 16211179

(51) Int. Cl.
*H04N 19/51* (2014.01)
*H04N 19/172* (2014.01)
(Continued)

(52) U.S. Cl.
CPC ........... *H04N 19/51* (2014.11); *H04N 19/172* (2014.11); *H04N 19/182* (2014.11); *H04N 19/593* (2014.11)

(58) Field of Classification Search
None
See application file for complete search history.

(56) References Cited

U.S. PATENT DOCUMENTS 5,982,441 A 11/1999 Hurd et al.
6,075,875 A 6/2000 Gu
(Continued)

FOREIGN PATENT DOCUMENTS

| EP | 0375073 | 6/1990 |
|---|---|---|
| EP | 2051524 | 4/2009 |
| JP | 2007049594 | 2/2007 |

OTHER PUBLICATIONS

International Search and Written Opinion of PCT/GB2017/053716 dated Feb. 20, 2018.

*Primary Examiner* — Samuel D Fereja
(74) *Attorney, Agent, or Firm* — Workman Nydegger (57) ABSTRACT

Encoding a video data stream comprising a first and second frame of video data, encoding comprising the steps of: obtaining motion prediction data for a plurality of pixels, the motion prediction data indicative of the predicted relative motion of the plurality of pixels between the first and second frames of video data; obtaining a data mask comprising data indicative of relative weights to be applied for predicting pixels for the second frame; determining update data to define a relative difference between a plurality of pixels in the first frame and a corresponding plurality of pixels in the second frame, wherein said update data is based on a weighted scaling of the motion prediction data and the second frame of video data, said weighted scaling based on
(Continued)

the data mask; and encoding the video data stream comprising at least the first frame of video data and the update data.

20 Claims, 5 Drawing Sheets

(51) Int. Cl.
*H04N 19/176* (2014.01)
*H04N 19/182* (2014.01)
*H04N 19/593* (2014.01)

(56) References Cited

U.S. PATENT DOCUMENTS

| | | |
|---|---|---|
| 8,238,428 B2 | 8/2012 | Karczewicz |
| 2002/0191695 A1 | 12/2002 | Irvine et al. |
| 2010/0067574 A1 | 3/2010 | Knicker et al. |
| 2012/0063515 A1* | 3/2012 | Panchal ............... H04N 19/463 375/240.16 |
| 2012/0082394 A1* | 4/2012 | Su ........................... H04N 5/21 382/236 |
| 2012/0281758 A1* | 11/2012 | Orlick ................... H04N 19/176 375/240.14 |
| 2012/0314772 A1* | 12/2012 | Chen .................... H04N 19/521 375/240.16 |
| 2013/0051467 A1* | 2/2013 | Zhou .................... H04N 19/105 375/240.13 |
| 2017/0013279 A1* | 1/2017 | Puri ..................... H04N 19/527 |

* cited by examiner

| 0.00 | 0.00 | 0.16 | 0.00 | 0.00 |
|------|------|------|------|------|
| 0.00 | 0.00 | 0.00 | 0.00 | 0.84 |
| 0.00 | 0.00 | 0.00 | 0.00 | 0.00 |
| 0.00 | 0.00 | 0.00 | 0.00 | 0.00 |
| 0.00 | 0.00 | 0.00 | 0.25 | 0.00 |

$mask_1$

Figure 5

MOTION COMPENSATION TECHNIQUES FOR VIDEO

RELATED APPLICATIONS

This application is a 371 nationalization of PCT/GB2017/053716 filed on Dec. 12, 2017 which claims priority to GB 1621117.9 filed on Dec. 12, 2016, both of which are incorporated herein in their entireties.

FIELD OF THE INVENTION

The invention broadly relates to the field of video encoding and content delivery. In particular the invention relates to a method of encoding and decoding video data in a low-entropy manner.

BACKGROUND OF THE INVENTION

It is known to encode videos or video streams for storage or streaming, in order to reduce the amount of data required to store them or the bandwidth required for their transmission. Techniques to encode a video are well known and commonly used, for example the H.264/AVC standard which uses a combination of image compression and motion based estimation techniques to encode a stream of video data.

Typically a frame of video data may be compressed using image compression techniques in which the frame is compressed relative to the information contained in the frame itself. This is technique utilises spatial, or transform, encoding and is known as intra-frame encoding. Alternatively a frame of video data may be compressed with reference to the information contained in neighbouring frames of video data. This is temporal encoding and is known as inter-frame encoding. Both intra- and inter-frame encoding are well known techniques in video encoding.

In standards such as H264 each individual frame in an encoded video stream is divided into a number of equal sized macroblocks. A macroblock is a group of neighbouring pixels, typically in a sixteen by sixteen square though other sizes of macroblocks are used. In intra-frame encoding the data in a H.264/AVC standard macroblock is compressed by referring to the information contained in the previously-coded macroblocks to the left and/or above said macroblock in the same frame. Inter-frame encoding in the H.264/AVC standard is a temporal, motion based form of compression, which is encoded with reference to a reference frame.

Standards such as H264 allow for an individual frame to be encoded using both intra- and inter-frame encoding techniques. Here the frame split into intra-only and inter-only macroblocks or tiles (within the same frame) with the individual tiles being encoded using either intra- or inter-frame encoding. Such techniques therefore allow for the frame to be encoded with a lower entropy using both intra and inter techniques.

In H264, when encoding using both techniques, a binary mask is employed where individual macroblocks/tiles or groups of tiles are defined as being either an intra-only or inter-only block. As the frame is split into macroblocks/tiles of a known size the binary mask simply identifies which tiles are intra-encoded (or inter-encoded) typically using a value of 0 or 1 to identify which technique is to be used.

Whilst the encoding allows the mixture of intra and inter-frame encoding within the same frame such techniques have limitations which result in degradation of the image quality. One such limitation of the encoding methodology used in H264 is the use of tiles or macroblocks which are an integral feature of H264. The use of the macroblocks, and the binary mask, mean that the transition in the image between intra- and inter-frame encoding will only occur at macroblocks. Therefore such techniques cannot cope with arbitrary shapes (which typically occur in a video frame) and may result in sharp transitions. Furthermore, it is found that due to the sharp boundary between tiles switching between inter and intra tiles may cause artefacts during encoding.

SUMMARY OF THE INVENTION

Accordingly in order to mitigate some of the above problems there is provided a method of encoding a video data stream comprising a first and second frame of video data, the method comprising the steps of: obtaining motion prediction data for a plurality of pixels, the motion prediction data indicative of the predicted relative motion of the plurality of pixels between the first and second frames of video data; obtaining a data mask comprising data indicative of relative weights to be applied for predicting pixels for the second frame; determining update data to define a relative difference between a plurality of pixels in the first frame and a corresponding plurality of pixels in the second frame, wherein said update data is based on a weighted scaling of the motion prediction data and the second frame of video data, said weighted scaling based on the data mask; and encoding the video data stream comprising at least the first frame of video data and the update data.

There is also provided a method of decoding an encoded video data stream the method comprising the steps of: decoding the first frame of video data in the encoded video data stream; receiving motion compensation data, said motion compensation data comprising data indicative of the predicted relative motion of a plurality of pixels between the first and a second frame of video data; receiving a data mask, said data mask comprising data indicative comprising data indicative of relative weights to be applied for predicting pixels for the second frame; receiving update data, said update data defining a relative difference between a plurality of pixels in the first frame and a corresponding plurality of pixels in the second frame; and decoding the second frame of video data by predicting a plurality of pixels for the second frame of video data, said prediction based on a weighted scaling of the update data and the motion prediction data wherein the weighted scaling is based on the data mask data.

Accordingly, the present invention utilises a pixel-by-pixel analysis to determine how the pixel for a frame of video data should be encoded using a combination of motion estimation from a different frame and data from the current frame. Beneficially the use of the weighted data defines what combination of motion prediction data and intra-compression should be used to encode the pixel. As the invention utilises a blended pixel-by-pixel determination motion compression techniques (which have a lower entropy) may be used for arbitrary shaped and sized objects and furthermore reducing the effects of sharp boundaries which are known to occur in the prior art.

Furthermore, the encoding and decoding techniques of the present invention allow for a plurality of frames of video data to be encoded as a first frame and data describing the transformation of the subsequent frames relative to the first. Beneficially the amount of data used to encode the subsequent frames of video data may be varied in accordance with the available bandwidth thus allowing a frame to be described with a greater, or lesser, amount of data depending on the available bandwidth.

Therefore, the present invention allows for lower entropy encoding, and decoding, to occur whilst maintaining the quality of the video data.

Other aspects of the present invention will be apparent from the appended claims.

BRIEF DESCRIPTION OF THE DRAWINGS

Embodiments of the invention will now be described with reference to the accompanying drawings, in which.

DETAILED DESCRIPTION OF THE EMBODIMENT(S)

Embodiments of the present inventions will be now described with reference to the attached Figures. It is to be noted that the following description is merely used for enabling the skilled person to understand the present invention, without any intention to limit the applicability of the present invention to other embodiments which could be readily understood and/or envisaged by the reader.

The present invention defines a system and method for encoding, and decoding, a stream of video data comprising a plurality of frames. One or more of the frames of video data is encoded in a per-pixel (per-pel) manner where the individual pixels are encoded in a blended, weighted manner. In particular the invention determines an accuracy associated with encoding of a pixel using a temporal (inter-frame) motion prediction technique. If the motion prediction technique is determined to be accurate, then the pixel is preferentially encoded using a motion prediction technique (as such techniques are associated with a lower entropy). Conversely if the motion prediction technique is deemed to be inaccurate then the pixel is encoded utilising an intra-frame encoding technique (which is typically more accurate but has a higher entropy associated with it). Alternatively a weighted mix of the techniques is used. In order to define how the pixels of each frame are encoded, for each frame a non-binary mask is defined, the non-binary mask being indicative of the accuracy (or lack thereof) of the temporal encoding technique.

Figure 1:
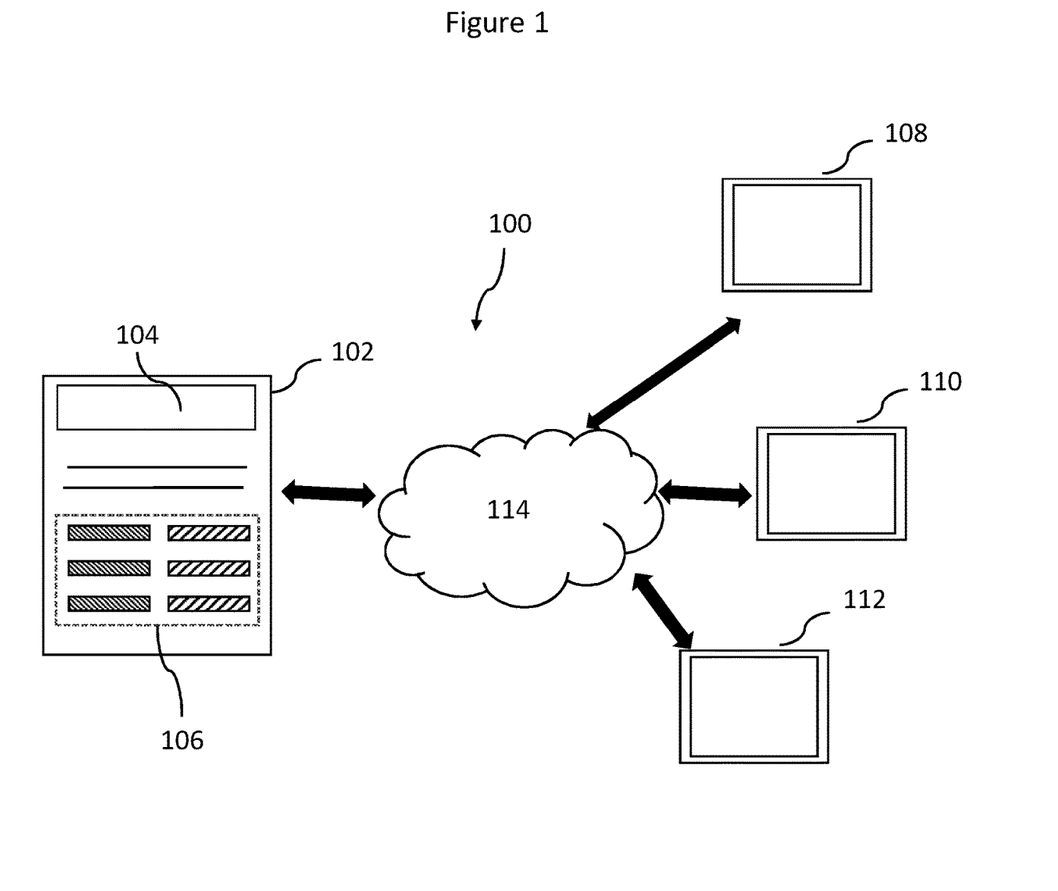
FIG. 1 is a block diagram showing a system for performing an example encoding method.

FIG. 1 is a block diagram of a system for performing the blended per-pixel encoding methodology according to an aspect of the invention.

In FIG. 1 there is shown the system 100, the system 100 comprising a streaming server 102 connected via a network to a plurality of client devices 108, 110, 112.

The streaming server 104 comprising an encoder 104, the encoder configured to receive and encode a first video stream utilising the methodology described herein. The streaming server 104 is configured to deliver an encoded video stream 106 to a plurality of client devices such as set-top boxes smart TVs, smartphones, tablet computers, laptop computers etc., 108, 110 and 112. Each client device 108, 110 and 112 is configured to decode and render the encoded video stream 106. The client devices and streaming server 104 are connected via a network 114.

For ease of understanding the system 100 of FIG. 1 is shown with reference to a single streaming server 102 and three recipient client devices 108, 110, 112 though in further embodiments the system 100 may comprise multiple servers (not shown) and several tens of thousands of client devices.

The streaming server 102 can be any suitable data storage and delivery server which is able to deliver encoded data to the client devices over the network. Streaming servers are known in the art, and use unicast and/or multicast protocols. The streaming server is arranged to encode and store the encoded data stream, and provide the encoded video data in one or more encoded data streams 106 to the client devices 108, 110 and 112. The encoded video stream 106 is generated by the encoder 104. The encoder 104 in FIG. 1 is located on the streaming server 102, though in further embodiments the encoder 104 is located elsewhere in the system 100. The encoder 104 generates the encoded video stream in accordance with the methodology as described with reference to FIGS. 3 and 4.

The client devices 108, 110 and 112 are devices known in the art and comprise the known elements required to receive and decode a video stream such as a processor, communications port and decoder. The decoder configured to decode the encoded data stream 106. The process of the decoder decoding the encoded video stream is described in detail with reference to FIG. 5.

An input video stream is encoded at the encoder 104 to generate an encoded data stream 106. As described in detail below the encoded data stream 106 is encoded using a per-pixel blend of intra and inter-encoding techniques. The encoder 104 generates an initial frame $f_0$ (as an I-frame) which is encoded with only reference to itself. To describe subsequent frames of data the encoder 104 generates (or receives) motion prediction data describing the motion of a plurality of pixels of the frame. The process of generation of the motion prediction data is described with reference to FIG. 3.

The encoder 104 also generates (or receives) a mask for each frame. The mask comprises data which describes the accuracy (or inaccuracy) of the motion prediction data. From the motion prediction data and the mask data the encoder can define update data, the update data defining the data required to describe the transformation between $f_0$ and $f_1$. This update data is encoded at the encoder 104 and forms part of the encoded video stream 106 which is sent to the client devices.

Figure 2:
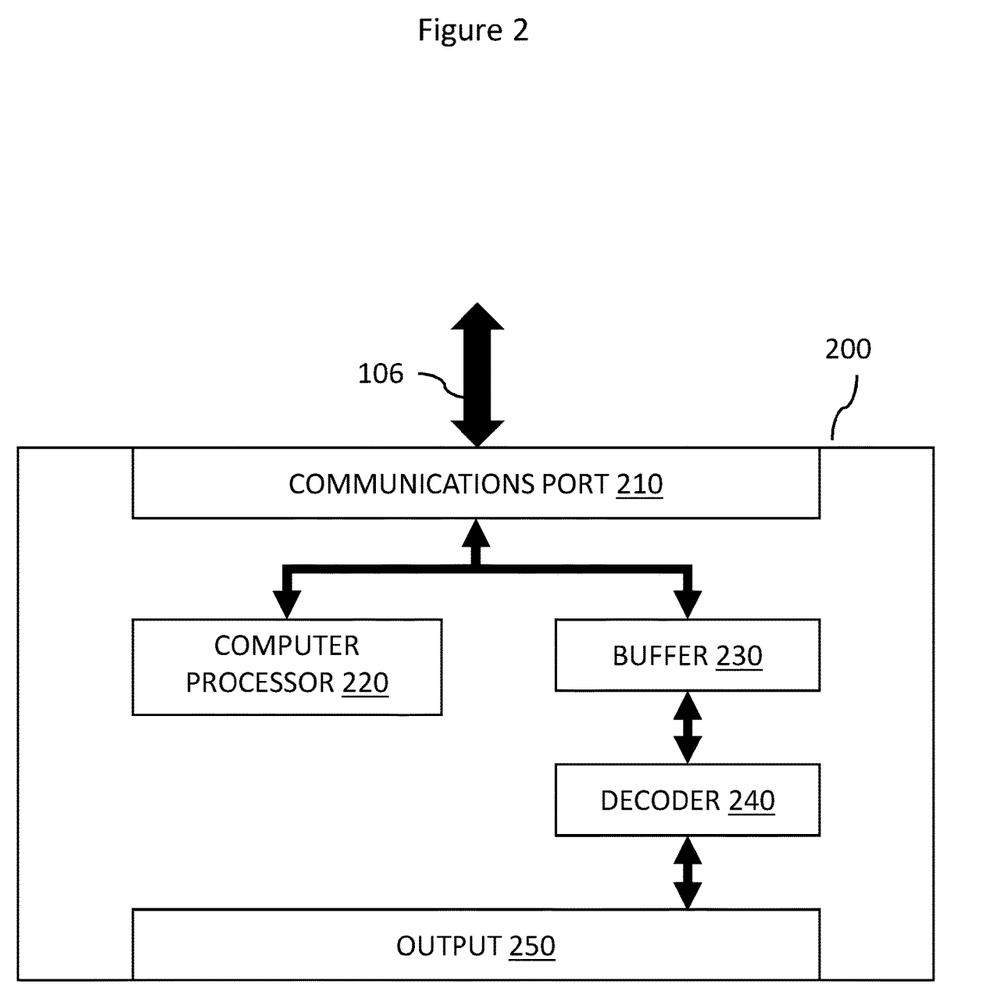
FIG. 2 is a block diagram showing an example client device capable of decoding a stream of video data.

Thus the present invention uses the motion compensation data in a weighted manner. FIG. 2 is a block diagram showing an example client device 200 configured to decode the encoded data sent by the encoder 104 as the encoded data stream 106. The client device 200 comprises a communications port 210, a computer processor 220, a buffer 230, a decoder 240 and an output 250.

The computer processor 220 is configured to initiate and control reception of the encoded data stream 106 via the communications port 210.

As described above part of the encoded data stream 106 the stream comprises a key frame initial frame $f_0$ and for each subsequent frame ($f_1, f_2 \ldots f_n$) related to the key frame $f_0$ there is provided an update frame (update$_1$, update$_2$ ... update$_n$), optical flow data ($OF_1, OF_2 \ldots OF_n$) and mask data (mask$_1$, mask$_2$ ... mask$_n$). The decoder 240 is configured to reproduce frame $f_1$, based on frame $f_0$ and the update data update$_1$, $OF_1$ and mask$_1$.

Frame $f_2$ is reproduced based on frame $f_1$ (which has been decoded from $f_0$, update$_1$, $OF_1$ and mask$_1$) and update$_2$, $OF_2$ and mask$_2$. This process continues until $f_n$.

The processor performed by the decoder 240 to decode the encoded video stream is described with reference to FIG. 5.

Figure 3:
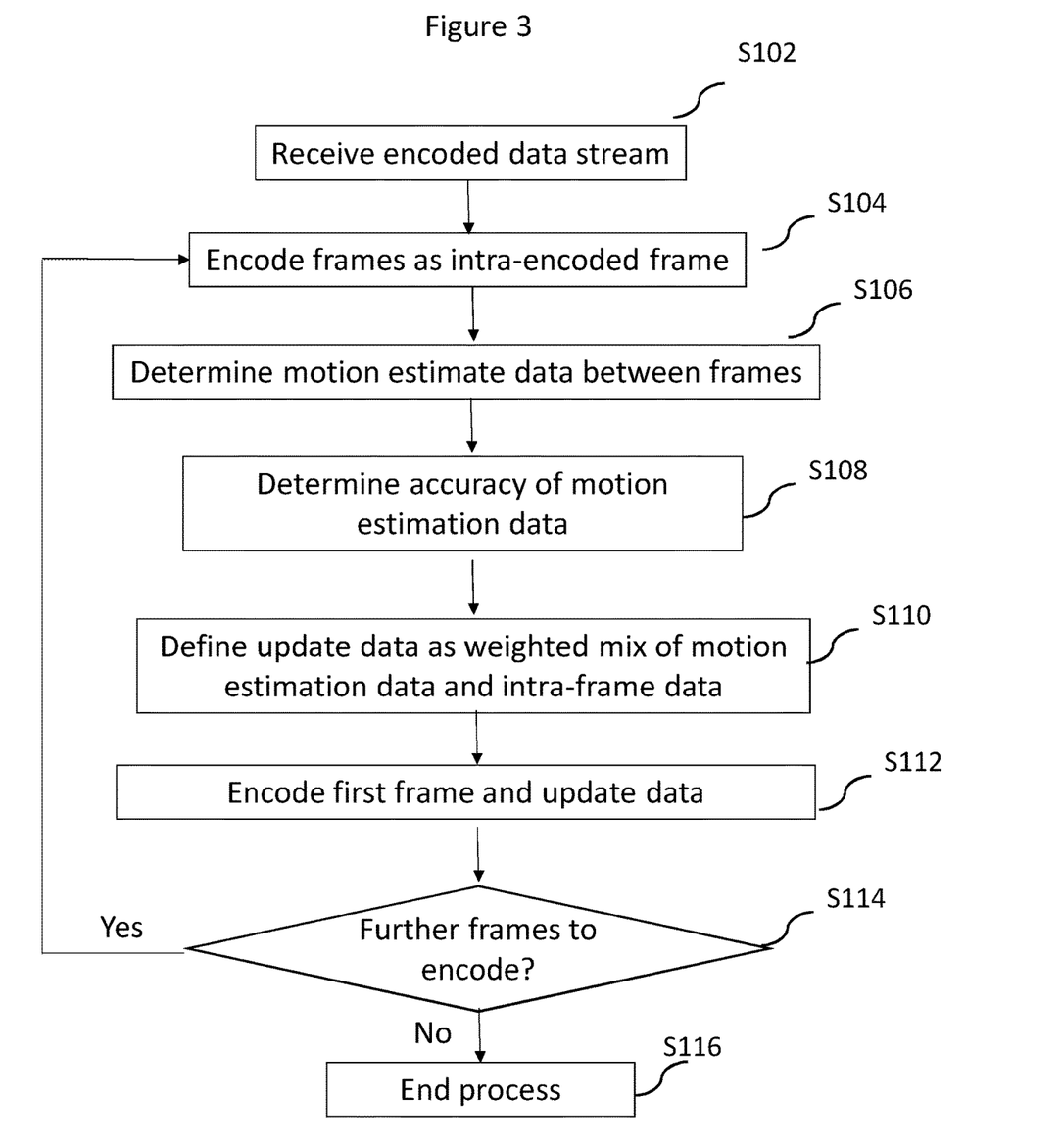
FIG. 3 is a flow chart of the methodology of encoding an video stream according to an aspect of the invention.
Figure 4A:
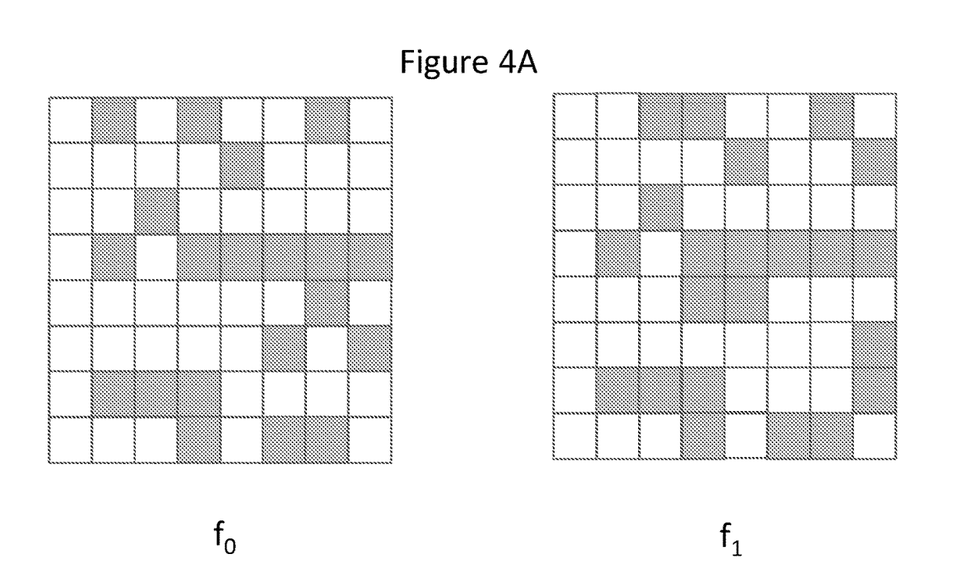
FIG. 4A to 4C are schematic representations of the selection and encoding of pixels according to the method of FIG. 3.

FIG. 3 is a flow chart of the encoding process according to an aspect of the invention.

At step S102 the encoder receives a stream of video data comprising a number (n) of frames $f_0$, $f_1$ to $f_n$ to be encoded (where the subscript identifies the frame number).

As is known in motion compensation encoding techniques, such as H264, a key-frame or I-frame is defined. The I-frame is solely encoded with reference to itself. In the present invention frame $f_0$ is equivalent to the I-frame as frame $f_0$ is only encoded with reference to itself. In the following description frames $f_1$ to $f_n$ are the frames which may be encoded with reference to frame $f_0$.

The following process occurs for each of the frames $f_1$ to $f_n$. For ease of understanding the following is described with reference to the encoding of frame $f_1$.

Once the encoder receives the stream of video data frame $f_0$ is identified and the encoding process begins.

At step S104 frames $f_0$ and $f_1$ are encoded using an intra-frame encoding technique. Any known encoding intra-frame technique may be used, for example, a DCT technique.

FIG. 4A is a schematic representation of frames $f_0$ and $f_1$. FIG. 4A comprises the frame of video data comprising 64 pixels in an 8×8 image. As will be appreciated this is a simplified representation of an image for the purpose of aiding the understanding of the invention.

Once encoded the process continues to step S106.

At step S106, for each of a plurality of pixels in frame $f_1$ (and preferably for all pixels, though a subset of pixels may be used) a measure of the motion between frames $f_0$ and $f_1$ is determined. The measure of the motion is determined using a motion estimation technique. Such pixel based techniques are known and used in the field of video compression. In a preferred embodiment an optical flow technique is used to determine the apparent motion of the physical objects in the frame (e.g. edges, surfaces and objects). Various optical flow motion estimation techniques are known in the field of video compression and any suitable optical flow method, such as minimising sum of squared differences, differential methods etc., may be used.

The optical flow data (motion estimation data) describing the motion between frames $f_0$ and $f_1$ is stored and identified as the optical flow data for frame $f_1$ as $OF_1$.

Figure 4B:
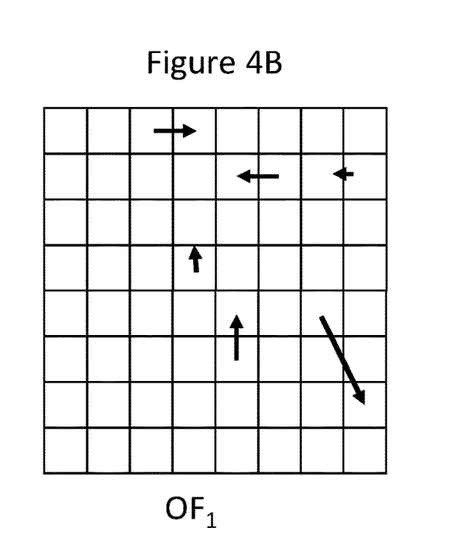

FIG. 4B is a schematic representation of the optical flow data $OF_1$ describing the motion between frame $f_0$ and frame $f_1$. FIG. 4B represents the optical flow data in the form of vectors, though as will be appreciated in a preferred embodiment the optical flow data is recorded as a matrix identifying the originating pixel from frame $f_0$. The individual arrows shown in FIG. 4B representing the optical flow as defined by the vectors.

Once the optical flow data has been calculated the process continues to step S108. At step S108 the error associated with each pixel in frame $f_1$ is recorded, preferably, in a linear fashion, and more preferably in the range [0.0, 1.0]. In the preferred embodiment the error associated with the pixels of frame $f_1$ is stored as a mask for the frame as a mask, mask$_1$. As will be understood the error associated with frame $f_n$ is stored as mask$_n$.

The errors associated with the optical flow data provides an indication as to the likelihood of the originating pixel in frame $f_0$ for a given pixel in frame $f_1$. It is known that the error is dependent on the particular technique used to determine the optical flow data, and is further dependent on other factors used to estimate the optical flow. In one embodiment the particular algorithm used to estimate the optical flow is benchmarked against a standardised dataset in order to evaluate the accuracy and to determine the error associated with the methodology. In further embodiments the error is determined by comparing the predicted results for a frame with the actual results. Mathematically, in an embodiment this is expressed as:

$$\text{Error} = \frac{F_{i+1} - (F_i, OF_i)}{F_{i+1}}$$

Therefore at step S106 the encoding process determines the motion prediction data in order to describe the motion of pixel between frame $f_0$ and $f_1$, and step S108 determines the error associated with the motion prediction data as determined at step S106 in the form of a mask. Thus the data generated at step S108 provides a measure of the accuracy (or inaccuracy) of the motion prediction data.

Figure 4C:
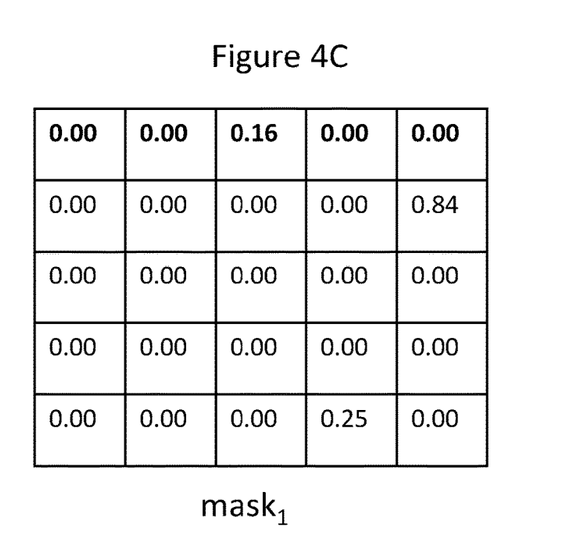

FIG. 4C is a schematic representation of the mask data. As defined above the mask has a range of [0.0, 1.0] and describes the accuracy of the optical flow data as determined at step S106.

In an embodiment in order to reduce the number of bits required to define the mask, the mask is passed through a low pass filter. The low pass filter allows for the mask to record the accuracy of the data whilst reducing the number of bits required to define the mask. The values shown in FIG. 4C as illustrative representations of the values of the data mask. For ease of understanding only some of the mask values of the 8×8 image of FIG. 4A are shown.

At step S110 the data to define frame $f_1$ from frame $f_0$ is determined. This data is defined as the update data, and identified as update$_1$.

In video compression it is known that inter-frame encoding based on motion prediction techniques will typically have a lower entropy associated with the encoding than intra-frame encoding for the same image. The reduction of the entropy is often an important consideration in video encoding. However whilst motion prediction typically has a lower entropy it is more susceptible to the introduction errors and artefacts into an image than intra-frame encoding. Thus the advantages associated with the use of motion prediction techniques must be balanced with the associated potential loss in image quality of reconstructed image.

A key aspect of the update data is that the update data is defined on a pixel-by-pixel basis as weighted blend of the intra-frame and inter-frame encoding pixel. In particular if the motion prediction data is determined to be accurate then the motion prediction data is preferentially used. If the motion predication data is deemed to be sufficiently inaccurate then intra-frame is preferentially used. When the accuracy is in between the invention uses a weighted mix of the motion prediction data and the intra-frame data. Thus unlike in the prior art in H264, the determination is made on a pixel-by-pixel basis and furthermore is made on a linear, non-binary basis where the pixel is defined as a weighted blend of the intra- and inter-frame data. In H264 a megablock may be encoded as either an inter- or intra-frame block. In contrast the present invention can define a pixel as a weighted blend dependent on the determined accuracy as recorded in the mask.

Mathematically this weighting, in a preferred embodiment, is defined as:

$$\text{Update}_{i+1} = F_{i+1} * M + [F_{i+1} - \text{Pred}(\hat{F}_i, OF)](1-M) \qquad \text{Equation 1}$$

Where Update is the data which describes the differences between frames i and i+1; F is the frame number, $\hat{F}_i$ the reconstructed frame, M the linear mask which defines the accuracy of the optical flow data OF, and Pred the predicted frame which results as a function of the original frame and the optical flow as defined at step S104.

As can be seen from equation 1, the equation is weighted such that if the mask data value is high (indicating the motion prediction data is inaccurate) then the left hand side of the equation (representing the intra-encoding technique) dominates. Similarly if the mask data value is low (indicating that the motion prediction data is accurate) the right hand side of the equation is dominant causing the update data to preferentially use the motion prediction data.

Thus the present invention utilises the mask data (which is a measure of the accuracy of the motion prediction) in order to determine the extent of the motion prediction data used. As can be seen if the mask data deems the motion compensation data to be accurate the equation will preferentially weight the update pixel to contain the motion compensation data (and vice-versa).

As will be appreciated the weighting may be expressed differently. In embodiments where the mask data measures the inaccuracy of the motion prediction data, the equation will differ to preferential weight the intra-frame data in instances of high levels of inaccuracy.

At step S112 the update data update$_1$ mask data mask$_1$ and the optical flow data OF$_1$ are encoded in the encoded data stream. This data is used to define the frame f$_1$. Therefore frame f$_1$ in the encoded data stream is defined as the originating image f$_0$, the update data update$_1$, mask data mask$_1$ and the optical flow data OF$_1$.

Such a method of encoding reduces the bandwidth of the stream whilst ensuring that the encoded stream has a low level of entropy. Whilst the encoding process may require further processing than other methods, the encoding servers typically have sufficiently powerful processors. As detailed below, the amount of processing power to decode the encoded stream at the client device (which typically has a much less powerful processor than the encoding server) is similar to existing methods.

At step S114 it is determined whether any further frames of video data are to be encoded. If no further frames are left the process terminates at step S116. If further frames are left to encode the process returns to step S104 and the subsequent frame is encoded. As stated above, the frames are encoded sequentially and with reference to the previous frame. Therefore frame f$_2$ is encoded with reference with f$_1$.

Therefore, in order to encode a series of frames f$_0$ to f$_n$, the encoded data stream will comprise a single frame (f$_0$) and the subsequent update, optical flow and mask data to define each of the subsequent frames. Thus the amount of data required to encode a series of frames can be reduced when compared to other encoding methodologies. A further aspect is that when the bandwidth available for an encoded stream is known the amount of data assigned to define the update, mask and optical flow data can be varied according to the available bandwidth. The level of precision used to define the update, mask and optical flow data in an embodiment therefore varies in accordance with the amount of bandwidth available. As this data defines the transformation between frames an increase in the amount of data to define the transformation may result in the frames being reconstructed with a higher degree of accuracy.

In a preferred embodiment the data required to encode the update, mask and optical flow data for each frame is defined such that it is less than the amount of data required to encode the frame using intra-encoding techniques. In the event that the data required to encode the update, mask and optical flow data is greater than intra-encoding of the frame the frame is simply encoded using intra-encoding techniques. Thus in a preferred embodiment the amount of data used does not increase the bandwidth requirement.

Figure 5:
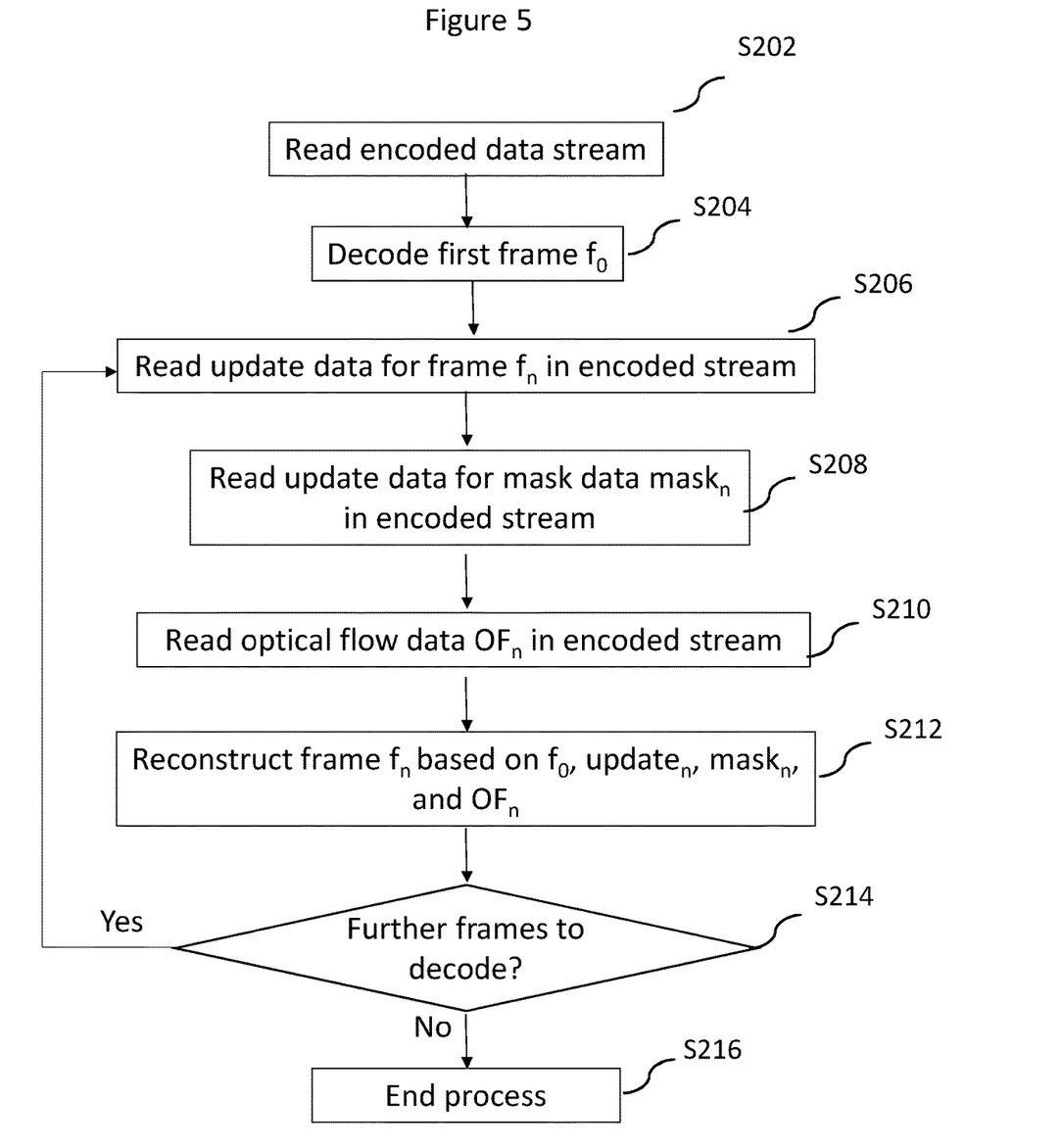
FIG. 5 is a flow chart of the methodology of decoding the encoded data according to an aspect of the invention.

FIG. 5 is a flowchart of the process of decoding the encoded frame, at a client device, as generated by the process of FIG. 3.

At step S202 the client device (such as set-top boxes smart TVs, smartphones, tablet computers, laptop computers etc.) receives the encoded stream 106 from the streaming server 102.

The process of initiate communication and receiving an encoded stream is well known in the art and need not be discussed further. Similarly the process of storing a predetermined amount of data in a buffer is known and not described further.

As discussed the encoded stream comprises an initial frame of video data f$_0$, said frame encoded using known intra-encoding techniques, and update data describing the data required to reconstruct frame f$_1$.

At step S204 frame f$_0$ is decoded at the decoder of the client device. In a preferred embodiment frame f$_0$ is encoded and subsequently decoded using known intra-encoding and decoding techniques.

Once decoded, frame f$_0$ is preferably rendered at the client device in a known manner.

At step S206 the decoder reads the update data update$_1$ for frame f$_1$. The update data update$_1$ is determined as with reference to FIG. 3.

At step S208 the decoder reads the mask data mask$_1$ for frame f$_1$. The mask data mask$_1$ is determined as with reference to FIG. 3.

At step S210 the decoder reads the optical flow data OF$_1$ for frame f$_1$. The optical flow data OF$_1$ is determined as with reference to FIG. 3.

Once the decoder has obtained the data frame f$_0$, update$_1$, mask$_1$ and OF$_1$ the decoder reconstructs frame f$_1$ at step S212.

As with the encoding (as described with reference to FIG. 3) the decoding utilises the same premise of a weighted blend of the motion prediction encoding techniques and intra-encoding techniques. This ensures that the pixels of the image are reconstructed in a manner that ensures that the best technique is used as well as ensuring that the entropy of the process is low.

In the case of the decoder, the invention minimises the amount of data sent in order to allow for reconstruction of the next frame of data to occur. Advantageously the invention reduces the bandwidth requirement by sending the f$_0$, update$_1$, mask$_1$ and OF$_1$ to the decoder.

In an ideal situation the motion compensation data (in the preferred example the motion compensation data is the optical flow data) would model the changes between frame f$_0$ and f$_1$, and allow frame f$_1$ to be perfectly reconstructed. However, in practice the motion compensation data is not entirely accurate, and therefore the decoder must account for the inaccuracies. Such an analysis is performed on a pixel-by-pixel basis using the mask and update data. The mask data, which is a non-binary mask, defines on a per-pixel basis the accuracy of the motion compensation data and the accuracy of the motion compensation data for the pixel.

The decoder therefore utilises a blended weighting of the motion compensation data and the update data (which itself is weighted according to the accuracy of the motion compensation data, see equation 1 and associated description) in order to define each pixel for frame $f_1$.

In a preferred embodiment the mathematical expression used to define the decoding, per pixel, is defined as:

$$\hat{f}_n = U\widetilde{pdate}_n e_n + \text{Pred}(\widetilde{F_0}, \widetilde{OF_{\infty}})(1-\widetilde{M_n})$$  Equation 2

Where the "^" symbol is used to identify the reconstructed frame. Where $f_1$ (generalised to $f_n$) is the reconstructed frame as determined by the decoder. Update$_n$ is the update data Pred is the predicted frame for frame $f_n$, said predicted frame is generated as a function of the frame as generated by the motion prediction data ($\widetilde{F_0}, \widetilde{OF_{\infty}}$) and is weighted by the determined accuracy $(1-\widetilde{M_n})$.

In further embodiments the exact form of the mathematical expression may vary, whilst still maintaining the premise that the use of the motion prediction data to define the frame is weighted in accordance with the accuracy associated with the motion compensation data, where in the event it is determined that the motion compensation is accurate the data is preferentially weighted to the use of motion compensation data.

Thus the reconstructed frame $f_1$ (generalised to $f_n$ in the above equation) comprises the update data and a weighted function of the motion prediction data. As defined in equation 1 the update data is already weighted according to the predicted accuracy of the motion prediction data, where a low level of accuracy will ensure that the intra-encoding data will be dominant. In equation 2 it can be seen that again the decoder will weight the data sources (update or motion predicted data) based on the accuracy of the motion prediction data. Thus a high level of accuracy/confidence in the motion prediction data will result in the motion prediction data being preferentially used to decode the frame.

A further aspect of the invention is that the decoding process is performed on a per-pixel basis. Standards such as H264 work on a macroblock basis, where each macroblock is encoded in either using intra-frame or inter-frame techniques. This results in transitions between the macroblocks and that the encoding can only occur on per macroblock basis which can cause sharp transitions. The present invention performs the encoding and decoding on a per-pixel basis utilising a blended weighting to ensure that encoding and decoding can handle arbitrary shaped objects without giving rise to transitions or artefacts.

Once the frame has been decoded the process continues to step S212.

At step S212 determine if further frames are present in the encoded data stream.

If no further frames are present the process proceeds to step S214 and the decoding process completes.

If further frames are present the process returns to step S206. As described with reference to FIG. 3 the previous frame (as decoded at step S210) becomes the reference frame and the frame to be decoded (e.g. frame $f_2$) is decoded with reference to the previous frame.

The process continues until such time that all frames are decoded.

Therefore the present invention defines a methodology for encoding and decoding video data on a per-pixel basis which helps ensure that the pixel is encoded in a manner that reduces artefacts without increasing the bandwidth requirement.

The invention claimed is:

1. A method of encoding a video data stream comprising a first and second frame of video data, the method comprising the steps of:
   obtaining motion prediction data for a plurality of pixels, the motion prediction data indicative of the predicted relative motion of the plurality of pixels between the first and second frames of video data;
   obtaining a data mask for the second frame of video data, the data mask comprising data indicative of per-pixel relative weights to be applied for predicting pixels for the second frame, the relative weights based on a measure of accuracy of the motion prediction data for each of the plurality of pixels;
   determining update data for each of the plurality of pixels of the second frame of video data, the update data defining a relative difference between a plurality of pixels in the first frame and a corresponding plurality of pixels in the second frame,
   wherein said update data for each of the plurality of pixels is defined on a pixel-by-pixel basis and on a linear, non-binary basis as a weighted blend of the motion prediction data and intra frame data, said weighted blend based on the data mask and dependent upon the measure of accuracy as recorded in the data mask; and
   encoding the video data stream comprising at least the first frame of video data and the update data for the second frame of video data.

2. The method of claim 1 wherein the second frame of video data is encoded as an intra-frame.

3. The method of claim 1 wherein the encoding of the video data stream further comprises encoding the mask data.

4. The method of claim 1 wherein the motion prediction data for a given pixel is determined as a measure of the relative motion of the pixel between the first and second frame of video data.

5. The method of claim 4 wherein the motion predication data is optical flow data.

6. The method of claim 5, wherein the encoding of the video data stream further comprises encoding the optical flow data.

7. The method of claim 1 further comprising the step of determining a measure of accuracy of the motion prediction data.

8. The method of claim 7 wherein the step of determining the measure of accuracy of the motion prediction data is based on a level of precision associated with the motion prediction data.

9. The method of claim 8 wherein the step of determining a level of precision comprises determining an error.

10. The method of claim 9 wherein the error is defined by comparing predicted results for a pixel based on the motion prediction data in the second frame with an actual result for the pixel.

11. The method of claim 1, wherein the data mask comprises non-binary values to define a non-binary mask.

12. The method of claim 11 wherein the step of defining the data mask includes the step of normalising the non-binary mask values between a range of [0.0, 1.0].

13. A method of decoding an encoded video data stream the method comprising the steps of:
   decoding the first frame of video data in the encoded video data stream;

receiving motion prediction data, said motion prediction data comprising data indicative of the predicted relative motion of a plurality of pixels between the first and a second frame of video data;

receiving a data mask for the second frame of video data, the data mask comprising data indicative of per-pixel relative weights to be applied for predicting pixels for the second frame, the relative weights based on a measure of accuracy of the motion prediction data for each of the plurality of pixels;

receiving update data for each of the plurality of pixels of the second frame of video data, the update data defining a relative difference between a plurality of pixels in the first frame and a corresponding plurality of pixels in the second frame, and the update data having been determined on a pixel-by-pixel basis and on a linear, non-binary basis as a weighted blend of the motion prediction data and intra frame data, said weighted blend based on the data mask and dependent upon the measure of accuracy as recorded in the data mask; and decoding the second frame of video data by predicting a plurality of pixels for the second frame of video data, said prediction based on a pixel-by-pixel weighted scaling of the motion prediction data and intra frame data, and wherein the weighted scaling is based on the update data and the data mask data.

14. The method of claim 13 further comprising the step of updating the plurality of pixels of the first frame of video data with the predicted pixel.

15. The method of claim 13 wherein the update data is based on a weighted scaling of the motion prediction data and the second frame of video data, said weighted scaling based on the data mask.

16. The method of claim 13 wherein the motion prediction data is optical flow data.

17. The method of claim 13 further comprising the step of decoding one or more subsequent frames of video data, wherein each subsequent frame of video has an associated motion prediction data, data mask, and update data.

18. The method of claim 13 wherein the motion predication data is optical flow data.

19. The method of claim 13 wherein the data mask comprises non-binary values to define a non-binary mask.

20. An apparatus for decoding a received encoded data stream, the apparatus comprising:

a decoder configured to decode said received encoded data stream;

a communications port configured to receive data from a source of the encoded data stream;

the apparatus configured to:

receive motion prediction data, said motion prediction data comprising data indicative of the predicted relative motion of a plurality of pixels between the first and a second frame of video data;

receive a data mask for the second frame of video data, the data mask comprising data indicative of per-pixel relative weights to be applied for predicting pixels for the second frame, the relative weights based on a measure of accuracy of the motion prediction data for each of the plurality of pixels;

receive update data for each of the plurality of pixels of the second frame of video data, the update data defining a relative difference between a plurality of pixels in the first frame and a corresponding plurality of pixels in the second frame, and the update data having been determined on a pixel-by-pixel basis and on a linear, non-binary basis as a weighted blend of the motion prediction data and intra frame data, said weighted blend based on the data mask and dependent upon the measure of accuracy as recorded in the data mask; and wherein the decoder is configured to:

decode a first frame of video data in the encoded video data stream; and decode the second frame of video data by predicting a plurality of pixels for the second frame of video data, said prediction based on a pixel-by-pixel weighted scaling of the motion prediction data and intra frame data, and wherein the weighted scaling is based on the update data and the data mask data.

* * * * *